US012087538B2

(12) United States Patent
Schmid et al.

(10) Patent No.: US 12,087,538 B2
(45) Date of Patent: Sep. 10, 2024

(54) METHOD FOR CARRYING OUT A SWITCHOVER OF A SWITCH, AND DRIVE SYSTEM FOR A SWITCH

(71) Applicant: Maschinenfabrik Reinhausen GmbH, Regensburg (DE)

(72) Inventors: Sebastian Schmid, Sinzing (DE); Benjamin Dittmann, Neutraubling (DE); Juergen Schimbera, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 408 days.

(21) Appl. No.: 17/611,206

(22) PCT Filed: Apr. 23, 2020

(86) PCT No.: PCT/EP2020/061285
§ 371 (c)(1),
(2) Date: Nov. 15, 2021

(87) PCT Pub. No.: WO2020/229124
PCT Pub. Date: Nov. 19, 2020

(65) Prior Publication Data

US 2022/0208482 A1 Jun. 30, 2022

(30) Foreign Application Priority Data

May 15, 2019 (DE) ..................... 10 2019 112 720.3

(51) Int. Cl.
*H01H 9/00* (2006.01)
*H01H 3/26* (2006.01)

(52) U.S. Cl.
CPC ............ *H01H 9/0027* (2013.01); *H01H 3/26* (2013.01); *H01H 2003/266* (2013.01); *H01H 2009/0061* (2013.01)

(58) Field of Classification Search
CPC .. H01H 3/26; H01H 9/0027; H01H 2003/266; H01H 2009/0061
See application file for complete search history.

(56) References Cited

U.S. PATENT DOCUMENTS 7,463,010 B2 12/2008 Dohnal et al.
9,143,072 B2 * 9/2015 Teising .............. H01H 33/6661
(Continued)

FOREIGN PATENT DOCUMENTS

DE 202010011521 U1 11/2011
RU 2629566 C2 8/2017
(Continued)

*Primary Examiner* — Jue Zhang
*Assistant Examiner* — Afework S Demisse
(74) *Attorney, Agent, or Firm* — LEYDIG VOIT & MAYER LTD.

(57) ABSTRACT

A method for carrying out a switchover of a switch from a current switching position to a target switching position by means of a drive system. The method includes receiving, by the drive system, a switching signal from a control device, determining, via a feedback signal of a feedback system, at least one value for a first position of a drive shaft of the drive system, determining, by the control device, a value for a second position of the drive shaft on the basis of the target switching position, to be moved to, of the switch, and ascertaining, by the control device, a difference between the value for the first position and the value for the second position of the drive shaft. The control device, depending on the feedback signal, acts on a motor until the value for the second position of the drive shaft is reached.

18 Claims, 5 Drawing Sheets

(56) References Cited

U.S. PATENT DOCUMENTS

| | | | | |
|---|---|---|---|---|
| 2007/0057652 | A1 | 3/2007 | Hoffman et al. | |
| 2013/0206555 | A1 | 8/2013 | Donhauser et al. | |
| 2014/0167529 | A1 | 6/2014 | Teising et al. | |
| 2015/0153749 | A1 | 6/2015 | Schmeckebier et al. | |
| 2017/0271985 | A1* | 9/2017 | Kawano | H02M 1/32 |

FOREIGN PATENT DOCUMENTS

| | | | |
|---|---|---|---|
| WO | WO 2008024048 | A1 | 2/2008 |
| WO | WO 2012135209 | A1 | 10/2012 |

* cited by examiner

METHOD FOR CARRYING OUT A SWITCHOVER OF A SWITCH, AND DRIVE SYSTEM FOR A SWITCH

CROSS REFERENCE TO RELATED APPLICATIONS

This application is a U.S. National Phase application under 35 U.S.C. § 371 of International Application No. PCT/EP2020/061285, filed on Apr. 23, 2020, and claims benefit to German Patent Application No. DE 10 2019 112 720.3, filed on May 15, 2019. The International Application was published in German on Nov. 19, 2020 as WO 2020/229124 A1 under PCT Article 21(2).

FIELD

The invention relates to a method for carrying out a switchover of a switch by means of a drive system. The invention further relates to a drive system for a switch, which drive system comprises at least one motor which acts on a drive shaft.

BACKGROUND

A drive for an on-load tap-changer is known, for example, from German utility model DE 20 2010 011 521 U1. This on-load tap-changer drive has a motor which is rigidly connected to the corresponding on-load tap-changer via a rod. The motor is operated by means of wiring, that is by operating motor contactors which switch the motor on and off. The on-load tap-changers are then operated via the drive shaft. Once the switch is assembled, only few changes can be made to the drive. As a result, the drive is rigid and inflexible. Even simple adjustments require complex conversion measures.

On-load tap-changers are usually used for voltage regulation in different transformers. A drive system is used for operating the on-load tap-changer. In this case, a motor, which is arranged on a transformer housing, is connected to the on-load tap-changer via a rod. Power is supplied to the motor by operating electromechanical contactors. Depending on the wiring, the motor is operated in such a way that its drive shaft rotates either in one or the other direction. In these cases, the current position or location of the on-load tap-changer is not checked before a switchover. It is always assumed that the on-load tap-changer has not changed location since the last operation.

SUMMARY

In an embodiment, the present invention provides a method for carrying out a switchover of a switch from a current switching position to a target switching position by means of a drive system. The method includes receiving, by the drive system, a switching signal from a control device, determining, via a feedback signal of a feedback system, at least one value for a first position of a drive shaft of the drive system, determining, by the control device, a value for a second position of the drive shaft on the basis of the target switching position, to be moved to, of the switch, and ascertaining, by the control device, a difference between the value for the first position and the value for the second position of the drive shaft. The control device, depending on the feedback signal, acts on a motor until the value for the second position of the drive shaft is reached.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
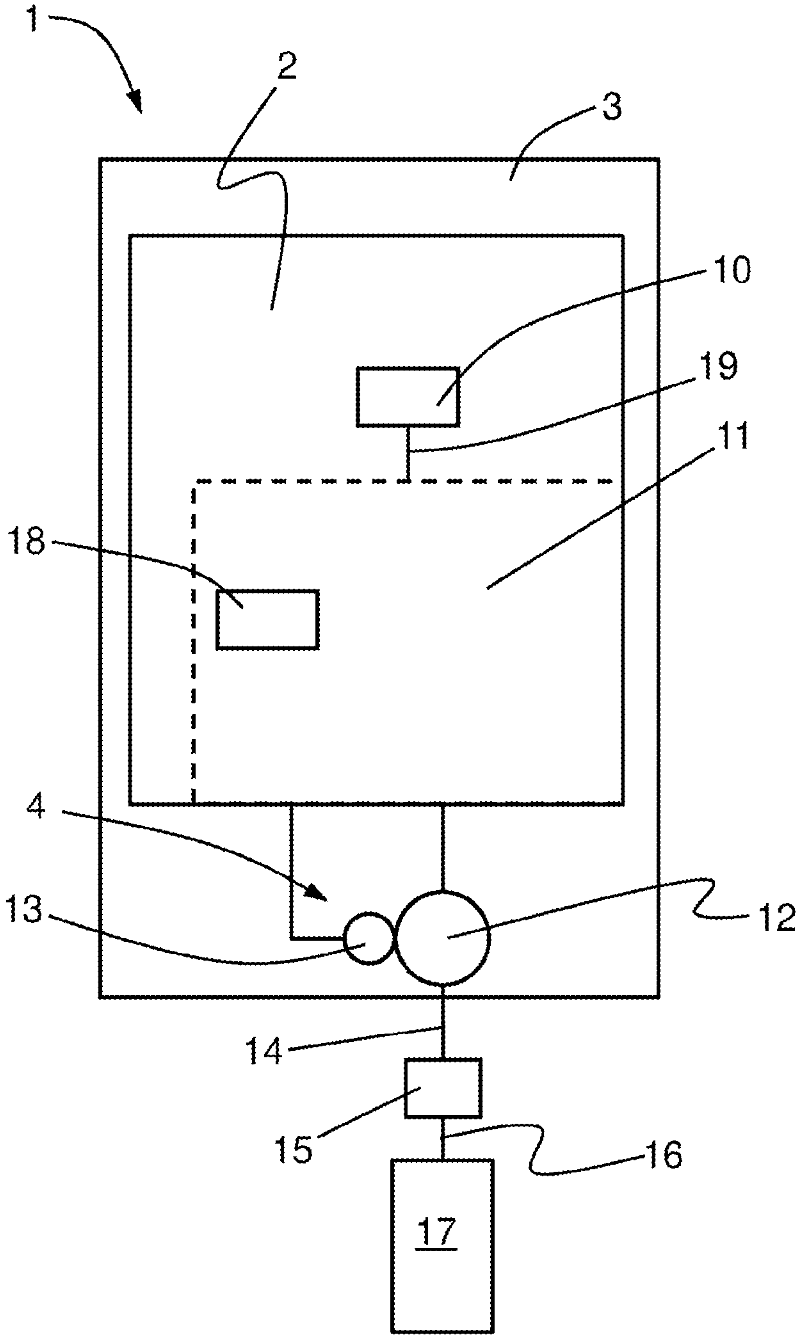
FIG. 1 shows a schematic illustration of an exemplary embodiment of a switch having a drive system according to the invention.

Exemplary embodiments of the present invention provide a method for switching over a switch, by way of which the changeover from one switching position to a following switching position is always precisely executed in order to improve reliability during the switchover and to make it more secure.

A further embodiment of the invention provides a drive system for a switch for carrying out a switchover from a current switching position to a target switching position, which drive system ensures a precise and reliable changeover from one switching position to a following switching position.

The method according to an exemplary embodiment of the present invention for carrying out a switchover of a switch from a current switching position to a target switching position by means of a drive system is distinguished in that a switching signal is first received by the drive system from a control device. At least one value for a first position of a drive shaft of the drive system is then determined via a feedback signal of a feedback system. A value for a second position of the drive shaft is likewise determined on the basis of the target switching position, to be moved to, of the switch by the control device. A difference between the value for the first position and the value for the second position of the drive shaft is ascertained by the control device. Finally, the control device, depending on the feedback signal, acts on the motor until the value for the second position of the drive shaft is reached and therefore the switchover from the current switching position to a target switching position is complete.

Methods according to embodiments of the present invention have the advantage that the switchover from a current switching position to a target switching position can be carried out in a reliable manner in this way. Time changes in the drive system for a switch can likewise be taken into account with various methods according to the invention.

According to one possible embodiment of the invention, after the at least one value for the first position of the drive shaft in the current switching position is determined, this value for the first position of the drive shaft can be compared with the value for the position of the drive shaft of the target switching position moved to last. The target switching position moved to last corresponds to the current switching position from which the switchover should be made. If it is now established that the value for the first position of the drive shaft for the current switching position and the value for the position of the drive shaft of the target switching position moved to last do not correspond, the control device, depending on the feedback signal, acts on the motor until the value for the position of the drive shaft of the switching position moved to last is reached.

According to a further embodiment of the method, it is likewise possible that, after the value for the first position of the drive shaft is determined via the feedback signal of the feedback system, a check is made in respect of whether the first position is in a predefined tolerance range. The tolerance range can comprise several positions of the drive shaft around the current switching position.

In a preferred embodiment, the switchover of the switch from a current switching position to the target switching position takes place in such a way that a tap change operation has the value+1 or −1. This means that a switchover is made to the next lower or next higher switching position.

The position of the drive shaft can be detected using an encoder system, which is part of the feedback system. The encoder system is directly or indirectly coupled to the drive shaft. An association of switching positions of the switch and values for the position of the drive shaft can be stored in a memory of the control device.

The drive system according to various embodiments of the invention for a switch for carrying out a switchover from a current switching position to a target switching position is distinguished in that a drive shaft is provided which connects the drive system to the switch. A motor serves to drive the drive shaft. A control device generates the switching signals for the drive system. A feedback system which is functionally associated with the drive shaft and is connected to a power section of the drive system is designed to determine a value for a first position of a drive shaft of the drive system. A feedback signal can be generated on the basis of this position. A control unit of the control device, which is connected to the power section, is designed, depending on a switching signal and the feedback signal, to operate the motor until the target switching position is reached.

According to one possible embodiment of the invention, the control unit or the control device comprises a memory. The power section serves to supply power to the motor. An association of switching positions of the switch and values for the position of the drive shaft are stored in the memory.

The feedback system may comprise an encoder system which is directly or indirectly coupled to the drive shaft. The encoder system can be an absolute value encoder, a multi-turn absolute value encoder, a single-turn rotary encoder, a virtual rotary encoder or a virtual rotary encoder with at least one auxiliary contact.

The improved concept is based on, among other things, the idea that before a switch is operated, that is to say after a switching signal is received, a check is made on the basis of the position of the drive shaft in respect of where said drive shaft is located and accordingly where it has moved since the last operation. Therefore, a check is made in respect of whether the switch has moved away from the position moved to last between the last operation and the next operation. Here, it is not really assumed that the switch has been switched from one specific position to another specific position, for example tap position, in the meantime, but rather the check is made to determine whether mechanical parts have moved by a certain degree, for example due to vibrations. After the value for the first position of the drive shaft is determined, the value for the second position of the drive shaft is ascertained. The second value is allocated to a specific position of the switch. In the case of an on-load tap-changer, the value for the second position of the drive shaft corresponds to a tap position of the on-load tap-changer. After the difference between the values, that is the distance between the current position and the position to be moved to, is determined, the control device acts on the motor until the drive shaft reaches the second position. The monitoring is performed with the aid of the feedback system.

The invention and its advantages will now be explained in more detail using exemplary embodiments with reference to the appended drawings, without limiting the invention to the exemplary embodiment shown in so doing. The relative sizes of elements in the figures do not always correspond to the real relative sizes of elements since some forms are simplified and other forms are increased in size in comparison to other elements for improved illustration. Identical reference symbols may be used for elements of the invention which are the same or have the same effect.

FIG. 1 shows a schematic illustration of an exemplary embodiment of a switch arrangement 1 having a switch 17 and a drive system 3 which is connected to the switch 17 via a drive shaft 16. The method according to the invention for carrying out switching is possible using this drive system 3. The switch 17 can be an on-load tap-changer, diverter switch, selector, double reversing change-over selector, reversing change-over selector, change-over selector, circuit breaker, load switch or disconnecting switch. The drive system 3 includes a motor 12 which can drive the drive shaft 16 via a motor shaft 14 and, optionally, via a transmission 15. A control device 2 of the drive system 3 comprises a power section 11, which contains, for example, a converter for the open-loop- or closed-loop-controlled supply of power to the motor 12, and a control unit 10 for actuating the power section 11, for example via a bus 19. The drive system 3 has a feedback system 4 which is functionally associated with the drive shaft 16. The feedback system 4 can be an encoder system 13. Similarly, the encoder system 13 can be part of the feedback system 4. The feedback system 4 or the encoder system 13 is connected to the power section 11. The encoder system 13 is further directly or indirectly coupled to the drive shaft 16.

The encoder system 13 is designed to detect a first value for a position PI, for example an angular position, in particular an absolute angular position, of the drive shaft 16. For this purpose, the encoder system 13 can comprise, for example, an absolute value encoder, in particular a multi-turn absolute value encoder, single-turn rotary encoder, which is fastened to the drive shaft 16, the motor shaft 14 or another shaft, the position of which is unambiguously linked to the position P1, P2, . . . , PH of the drive shaft 16. For example, the position P1, P2, . . . , PH of the drive shaft 16 can be unambiguously determined from the position of the motor shaft 14, for example via a transmission ratio of the transmission 15. Furthermore, the encoder system 13 can comprise a virtual rotary encoder which determines the position of the motor shaft 14 and, from this, derives the position P1, P2, . . . , PH of the drive shaft 16.

The feedback system 4 is designed to detect a value for the position P1, P2, . . . , PH of the drive shaft 16. In an encoder system 13, which is configured as a multi-turn absolute value encoder or single-turn rotary encoder, the value for the position of the drive shaft 16 is made available in the form of a protocol.

With the design of the encoder system 13 as a virtual rotary encoder, the value for the position P1, P2, . . . , PH of the drive shaft 16 is ascertained from a rotor position of the motor 12. For example, inductive feedback due to the movement of the rotor in the motor windings of the motor 12 can be utilized for this purpose. Since the intensity of the feedback varies periodically, the rotor position can be approximately determined, in particular by means of signal analysis, for example by Fast Fourier Transform (FFT) analysis. Since one complete revolution of the drive shaft 16 corresponds to a large number of revolutions of the rotor, a conclusion about the position P1, P2, . . . , PH of the drive shaft 16 can be drawn from here with a very much higher degree of accuracy.

The encoder system 13 can also be designed as a combination of a virtual rotary encoder and an auxiliary contact which is directly or indirectly connected to the drive shaft 16. The value for the position P1, P2, . . . , PH of the drive shaft 16 is then formed from the signals of the virtual rotary encoder and the auxiliary contact.

The control device 2, in particular the control unit 10 and/or the power section 11, is designed to subject the motor 12 to open-loop control or closed-loop control, depending on a feedback signal which the feedback system 4 generates based on the value.

The control device 2, for example the control unit 10, uses the value for the position P1, P2, . . . , PH of the drive shaft 16 for determining the position of the switch 17. The value for the position P1, P2, . . . , PH of the drive shaft 16 can be specified as a range or tolerance. This allows for the accuracy of the drive system 3 to be increased and for the reliability of the switchover between the current switching position SJ to the target switching position SJ+K to be improved.

Figure 2:
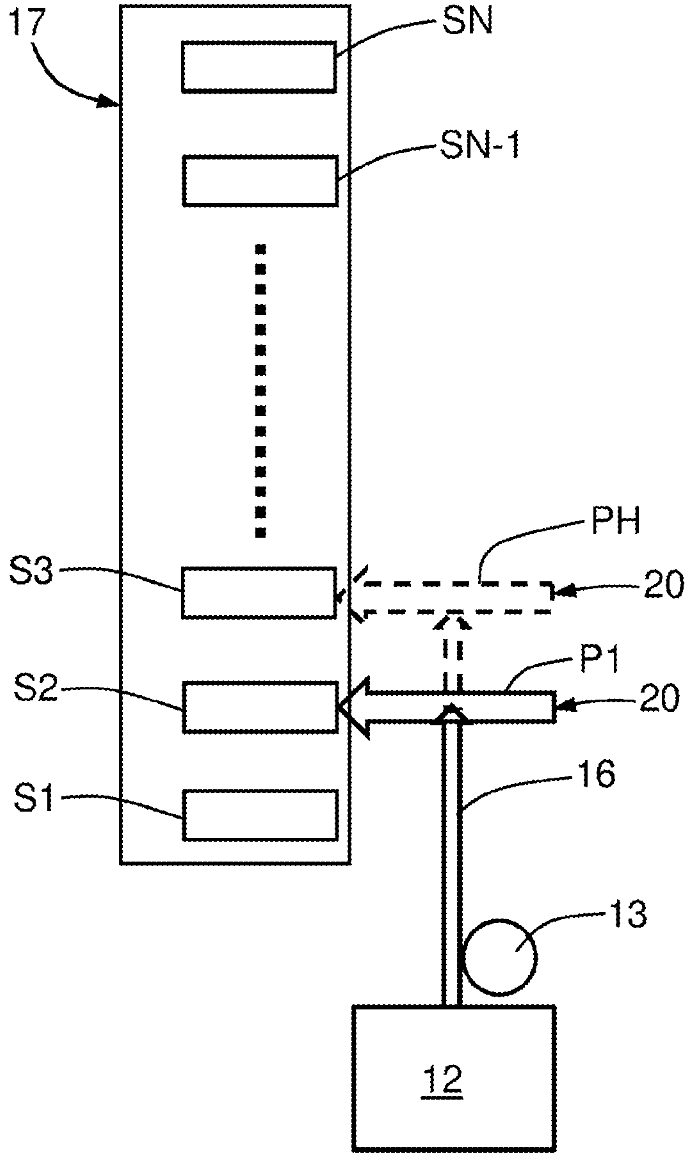
FIG. 2 shows a schematic illustration of the switch with the individual switching positions which can be moved to using the motor.

FIG. 2 shows a schematic illustration of the switch 17 with the individual switching positions S1, S2, . . . , SN which can be moved to using the motor 12. The encoder system 13 is associated with the drive shaft 16. In the embodiment described here, the encoder system 13 is directly associated with the drive shaft 16. When the motor 12 is operated by the control device 10, in conjunction with the power section 11, the switchover from, as illustrated here, the switching position S2 to the switching position S3 takes place in the switch 17. In FIG. 2, the ideal starting situation is illustrated by way of the contact 20 for the switching position S2 having the position P1 of the drive shaft 16. By way of operating the motor 12, the drive shaft 16 passes through the positions P2 to PH-1 and, at the end of the operation of the motor 12, has reached the position PH which corresponds to the target switching position S2. After the switchover has taken place, the contact 20 is electrically connected to the switching position S3. Therefore, the position PH of the drive shaft 16 unambiguously corresponds to the contact 20 with the switching position S3. A large number of positions P1, P2, . . . , PH are determined for the drive shaft 16 using the encoder system 13 for each switchover from one switching position SJ to the next higher switching position SJ+1 or the next lower switching position SJ-1. If this large number of positions P1, P2, . . . , PH has been determined by the encoder system 13, it is clear that, for example, the switchover from the switching position SJ to the next higher switching position SJ+1 has been unambiguously and reliably completed.

Figure 3:
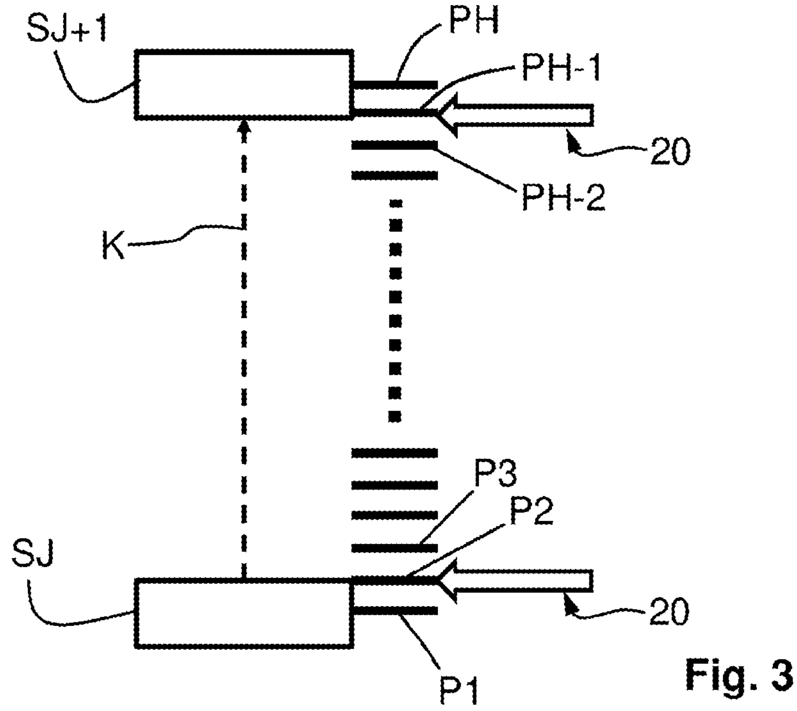
FIG. 3 shows a schematic illustration of the various positions of the movement of the drive shaft in order to move from one switching position to the next.

FIG. 3 shows a schematic illustration of the various positions P1, P2, . . . , PH to which the drive shaft 13 has to move in order to move from one switching position SJ to the next switching position SJ+1 (target switching position). In the starting situation illustrated here, the position P2 of the drive shaft 13 is not in the starting position P1 in the switching position SJ. In this situation, after a switching signal is received by the drive system 3, at least one value for a first position P2 of the drive shaft 16 of the drive system 3 is determined. This position P2 is determined via a feedback signal of a feedback system 4 or the encoder system 13. A value for a second position PH of the drive shaft 16 is also determined, wherein this value for the position PH of the drive shaft 16 corresponds to the switching position SJ+1 (target switching position), to be moved to, of the switch 17. The switchover from the switching position SJ to the switching position SJ+1 takes place with a tap-change operation K, which is 1 this case.

Proceeding from here, a difference between the value for the first position P2 and the value for the second position PH of the drive shaft 16 can be ascertained by the control device 2. The control device 2, depending on the feedback signal, then acts on the motor 12 until the value for the second position PH of the drive shaft 16, that is the switching position SJ+1 (target switching position), is reached.

According to the situation illustrated in FIG. 3, a switchover from the switching position SJ to the switching position SJ+1 (target switching position) can be achieved in a second way. A value for the first position P2 of the drive shaft 16 in the current switching position SJ is determined. This value for the first position P2 of the drive shaft 16 is compared with the value for the position PH of the drive shaft 16 of the target switching position SJ moved to last. If the value for the first position P2 of the drive shaft 16 for the current switching position SJ and the value for the position PH of the drive shaft 16 of the switching position SJ (target switching position SJ+K) moved to last do not correspond, as is the case here, the control device 2, depending on the feedback signal, acts on the motor 12 until the value for the position PH of the drive shaft 16 of the switching position SJ moved to last is reached. For the case illustrated here, this means that the motor 12 is operated in an opposite direction until the position P1 of the drive shaft 16 of the current switching position SJ is reached, which position of the drive shaft corresponds to the position PH of the drive shaft 16 of the switching position SJ moved to last, for example in the case of a switchover from the switching position SJ-1 to the switching position SJ (target switching position SJ+K). The drive shaft can then move away from positions P1, P2, . . . , PH until the switching position SJ+1 (target switching position SJ+K) is reached.

Figure 4:
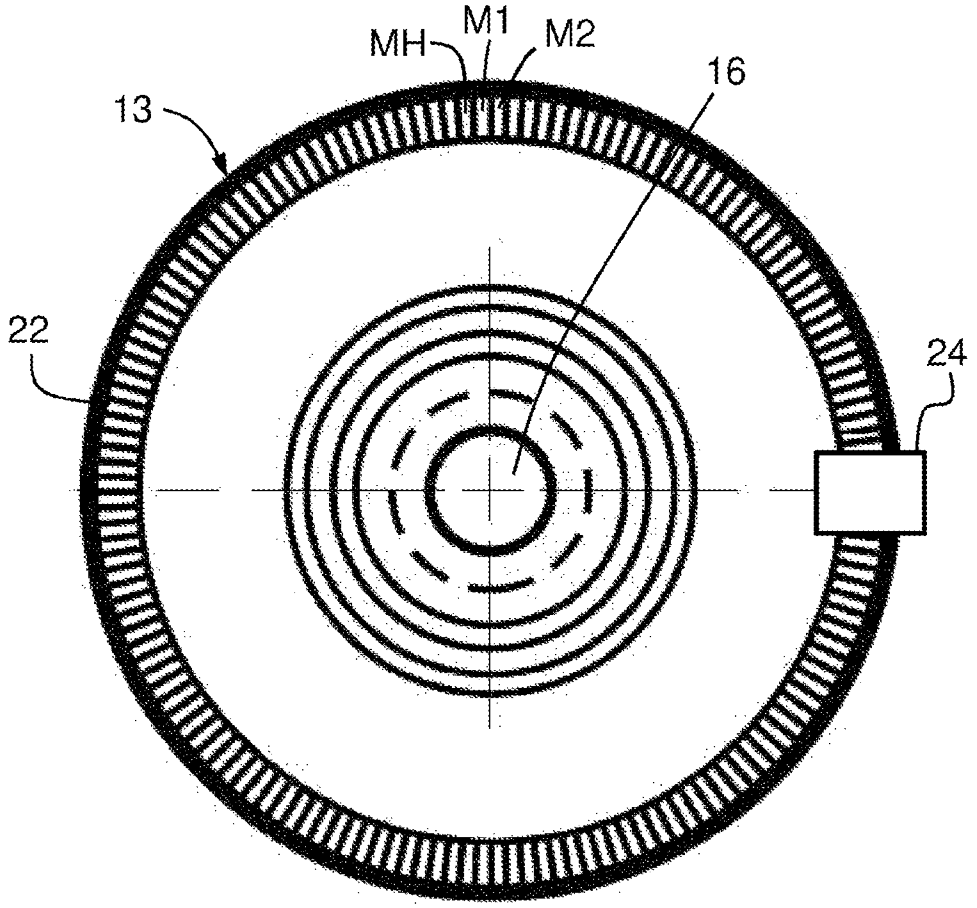
FIG. 4 shows a schematic illustration of one possible embodiment of a portion of the encoder system with which the positions of the drive shaft can be detected.

FIG. 4 shows a schematic illustration of a possible embodiment of a portion of the encoder system 13 with which the positions P1, P2, . . . , PH of the drive shaft 16 can be detected during the switchover. In the embodiment illustrated here, the encoder system 13 is an encoder disk 22 which is fixedly connected to the drive shaft 16. A sensor 24, which can detect the large number of identical markings M1, M2, . . . , MH arranged over the circumference of the encoder disk 22, is associated with the encoder disk 22. The markings M1, M2, . . . , MH correspond to the positions P1, P2, . . . , PH of the drive shaft 16.

Figure 5:
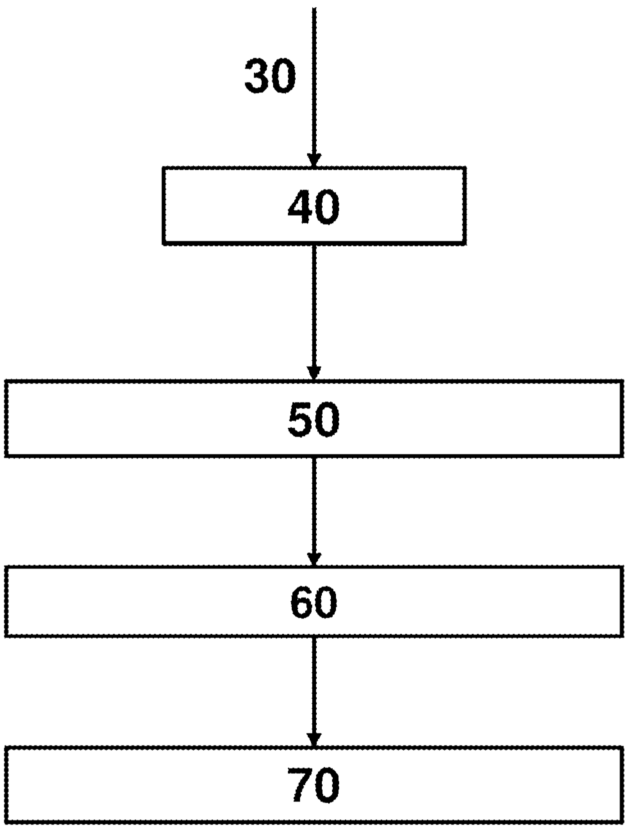
FIG. 5 shows an exemplary method sequence for operating a switch, in particular an on-load tap-changer, according to the invention.

FIG. 5 shows a method sequence for carrying out switching of a switching arrangement having a drive system 3 and a switch 17. The method will now be described proceeding from a switch 17, which is designed as an on-load tap-changer by way of example here. However, the switch 17 can also be designed as a diverter switch, selector, change-over selector, double reversing change-over selector or reversing change-over selector.

In the first step 40, a signal 30 for "switching" is initially passed to the control device 2. This signal 30 is generated by a voltage regulator, a monitoring system or by manual input. That is to say, the on-load tap-changer has to be, for example, operated in order to thereby adjust the voltage of the tap changing transformer. However, adjustment movements of the on-load tap-changer during maintenance, in the case of which the various switching positions S1, S2, . . . , SN are moved to, are also feasible.

In the next step 50, the switching position S1, S2, . . . , SN in which the on-load tap-changer is located is determined in the control device 2. For this purpose, a value for the position P1, P2, . . . , PH of the drive shaft 16 is queried via the power section 11. This takes place via the feedback system 4. Depending on the design, the value is transmitted to the power section 11 via the encoder system 13 by means of multi-turn absolute value encoders or single-turn rotary encoders, which are directly fastened to the drive shaft 16, or via the virtual rotary encoder, which for example utilizes inductive feedback due to the movement of the rotor in motor windings of the motor 12, and is queried by the control device 2.

In the best-case scenario, the value determined by the control device 2 corresponds to a value which is allocated to a specific switching position S1, S2, . . . , SN or tap position of the on-load tap-changer.

In a next step 60, the next switching position SJ+1 or tap position to be moved to and therefore the value for the position PH of the drive shaft 16 are determined. The specification of the switching position SJ+1 or tap position to be moved to is specified by the signal 30 for switching.

In the following step 70, a difference between the values for the current position P1 of the drive shaft 16, in the best-case scenario tap position, and the position PH, to be moved to, of the drive shaft 16 is calculated. The difference represents the ideal value which the drive shaft 16 has to reach by way of rotation. In other words, the difference is a distance to be covered by the drive shaft 16 and this is passed on as a target specification.

The control device 2, depending on the feedback signal, acts on the motor 12 until the position PH, to be moved to, of the drive shaft 16 and therefore the position to be moved to or tap position has been reached.

Figure 6:
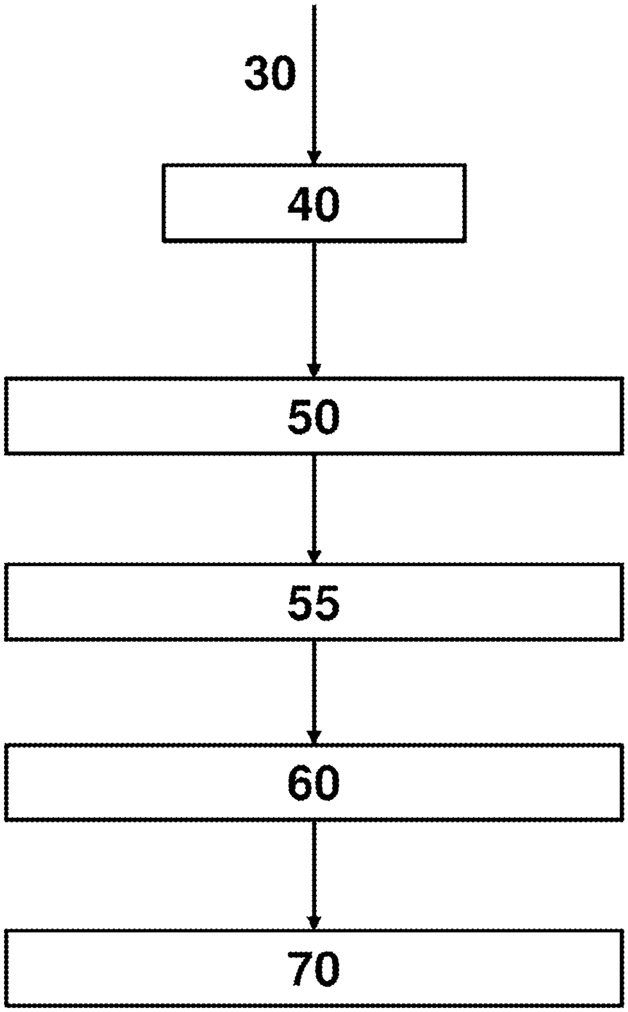
FIG. 6 shows a further exemplary method sequence for operating a switch, in particular an on-load tap-changer, according to the invention.

As an alternative, it is possible, as shown in FIG. 6, that the contact 20 is moved to position PH after step 50, that is to say after determining the current position P1 of the drive shaft 16. This is not always necessary. For example, it may occur that the contact 20 and therefore the drive shaft 16 connected to it has moved away from the position P1, which corresponds to one of the switching positions S1, S2, . . . , SN, due to vibration. The value for the position PH of the drive shaft 16, which the feedback system 4 reports to the power section 11 and therefore to the control unit 10, does not match the value for the position P1 of the drive shaft 16 and the switching position SJ moved to last (switching from the switching position SJ-1 to the switching position SJ). Therefore, if necessary, a correction of the position PH of the drive shaft 16 takes place in step 55 in such a way that the tap position SJ moved to last and therefore the associated value for the position P1 of the drive shaft 16 are assumed. The process continues, as described in FIG. 5, with the next step 60. In other words, a check is made in respect of whether the drive shaft 16 is where it should be after the last switchover and, if necessary, said drive shaft is moved to the position P1 of the drive shaft 16, that is to say is moved back to the "correct" starting point.

The risk of a faulty switchover is reduced due to the described position determination and corresponding adjustments.

The control device 2, in particular the control unit 10, has a memory 18 in which a value for the position of the drive shaft 16 is assigned for each specific switching position (S1, S2, . . . , SN) of a switch 17, in particular the tap position of an on-load tap-changer.

The travel profile specifies a target value from which the drive shaft 16 has to depart. When departing from the travel profile, the actual value, which is detected via the feedback system 4, can deviate from the target value. Depending on the specified possible deviation of the actual value from the target value, the action on the motor 12 can either be aborted or continued.

As an alternative, after determining the position P1, P2, . . . , PH of the drive shaft 16, a check can be made in respect of whether the ascertained value is located in a so-called tolerance range. This tolerance range can be associated with a specific position P1, P2, . . . , PH of the drive shaft 16 or tap position and can be determined in a variable manner. The tolerance range comprises, for example, a plurality of positions, for example the positions P1 P5 around the respective switching position S1, S2, . . . , SN. The selected tolerance range is dependent on the entire system. Furthermore, the tolerance range allows the method according to the invention to be carried out with less accurate components/hardware. If the value is located in a tolerance range, a correction as presented in step 55 is not necessary.

Since a tolerance range can be allocated to each switching position S1, S2, . . . , SN or tap position, the second value for the position PH of the drive shaft 16, that is to say the switching position or tap position to be moved to, can also be located in a tolerance range. This also allows for less accurate components/hardware to be used.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Switch arrangement
2 Control device
3 Drive system
4 Feedback system
10 Control unit
11 Power section
12 Motor
13 Encoder system
14 Motor shaft
15 Transmission
16 Drive shaft
17 Switch
18 Memory
19 Bus
20 Contact
22 Encoder disk
24 Sensor
30 Signal
40 Step
50 Step
55 Step
60 Step
70 Step
K Tap-change operation
M1, M2, . . . , MH Marking
P1, P2, . . . , PI, . . . , PH Position of the drive shaft, motor shaft
S1, S2, . . . , SJ, SN Switching position

The invention claimed is:

1. A method for carrying out a switchover of a switch from a current switching position to a target switching position by a drive system, the method comprising:

receiving, by the drive system, a switching signal from a control device;

determining, via a feedback signal of a feedback system, at least one value for a first position of a drive shaft of the drive system;

determining, by the control device, a value for a second position of the drive shaft to be moved to, of the switch, on the basis of the target switching position;

ascertaining, by the control device, a difference between the value for the first position and the value for the second position of the drive shaft; and the control device, depending on the feedback signal, acting on a motor until the value for the second position of the drive shaft is reached.

2. The method as claimed in claim 1, the method further comprising:

after the at least one value for the first position of the drive shaft in the current switching position is determined, comparing the value for the first position of the drive shaft with a value for the position of the drive shaft of the target switching position moved to last;

based upon determining the value for the first position of the drive shaft for the current switching position and the value for the position of the drive shaft of the target switching position moved to last do not correspond, the control device, depending on the feedback signal, acts on the motor until the value for the position of the drive shaft of the switching position moved to last is reached.

3. The method as claimed in claim 1, the method comprising, after the value for the first position of the drive shaft is determined via the feedback signal of the feedback system, checking whether the position is in a predefined tolerance range.

4. The method as claimed in claim 3, wherein the switchover from the current switching position to the target switching position is carried out based upon determining that the first position of the drive shaft is in the predefined tolerance range.

5. The method as claimed in claim 1, wherein the switchover of the switch from the current switching position to the target switching position is carried out in such a way that a tap-change operation has the value +1 or −1.

6. The method as claimed in claim 1, wherein the position of the drive shaft is detected using an encoder system, which is part of the feedback system, and in the process the encoder system is directly or indirectly coupled to the drive shaft.

7. The method as claimed in claim 1, wherein an association of switching positions of the switch and values for the position of the drive shaft are stored in a memory of the control device.

8. The method as claimed in claim 1, wherein determining, by the control device, the value for the second position of the drive shaft to be moved to further comprises:

determining, by the control device, the value for the second position of the drive shaft before acting on the motor to reach the value for the second position, and wherein ascertaining, by the control device, the difference between the value for the first position and the value for the second position of the drive shaft further comprises:

ascertaining, by the control device, the difference before acting on the motor to reach the value for the second position.

9. The method as claimed in claim 1, wherein ascertaining, by the control device, the difference between the value for the first position and the value for the second position of the drive shaft further comprises:

ascertaining, by the control device, the difference before acting on the motor until the value for the second position of the drive shaft is reached.

10. The method of claim 1, wherein the first position of the drive shaft of the drive system comprises the current position of the drive shaft of the drive system, and wherein the second position of the drive shaft to be moved to comprises the position the drive shaft will be moved to next.

11. A drive system for a switch for carrying out a switchover from a current switching position to a target switching position, the drive system comprising:

a drive shaft which connects the drive system to the switch a motor that is configured to drive the drive shaft;

a control device that is configured to determine a value for a second position of the drive shaft to be moved to on the basis of the target switching position and generate a switching signal for the drive system;

a feedback system which is functionally associated with the drive shaft and is connected to a power section of the drive system, the feedback system being configured to determine a value for a first position of the drive shaft of the drive system and, based on this position, to generate a feedback signal; and a controller of the control device, which is connected to the power section, the controller being configured to, depending on an ascertained difference between the value for the second position and the value for the first position of the drive shaft, the switching signal, and the feedback signal, operate the motor until the target switching position is reached.

12. The drive system as claimed in claim 11, wherein the control device comprises a memory, wherein the power section is configured to supply power to the motor, and wherein an association of switching positions of the switch and values for the positions of the drive shaft are stored in the memory.

13. The drive system as claimed in claim 11, wherein the feedback system comprises an encoder system which is directly or indirectly coupled to the drive shaft.

14. The drive system as claimed in claim 13, wherein the encoder system is an absolute value encoder, a multi-turn absolute value encoder, a single-turn rotary encoder, a virtual rotary encoder or a virtual rotary encoder with at least one auxiliary contact.

15. The drive system as claimed in claim 13, wherein the encoder system is a single-turn rotary encoder or a virtual rotary encoder with at least one auxiliary contact.

16. The drive system as claimed in claim 11, wherein a motor shaft is connected to the drive shaft for the switch via a transmission.

17. A drive system for a switch for carrying out a switchover from a current switching position to a target switching position, the drive system comprising:

a drive shaft which connects the drive system to the switch a motor that is configured to drive the drive shaft;

a control device that is configured to generates a switching signal for the drive system;

a feedback system which is functionally associated with the drive shaft and is connected to a power section of the drive system, the feedback system being configured to determine a value for a first position of the drive shaft of the drive system and, based on this position, to generate a feedback signal; and a controller of the control device, which is connected to the power section, the controller being configured to, depending on the switching signal and the feedback signal, adjust a predetermined rotation of the drive shaft for reaching the target switching position and operate the motor until the target switching position is reached according to the adjusted predetermination rotation.

18. The drive system according to claim 17, wherein the controller is further configured to adjust an amount of the predetermined rotation of the drive shaft based on an amount of difference between the value for the first position of the drive shaft and the current switching position.

* * * * *